United States Patent
Matsubayashi (10) Patent No.: US 7,691,505 B2
(45) Date of Patent: Apr. 6, 2010

(54) FUEL CELL SYSTEM

(75) Inventor: Takaaki Matsubayashi, Gunma (JP)

(73) Assignee: Sanyo Electric Co., Ltd., Osaka (JP)

( * ) Notice: Subject to any disclaimer, the term of this patent is extended or adjusted under 35 U.S.C. 154(b) by 1162 days.

(21) Appl. No.: 11/289,633

(22) Filed: Nov. 30, 2005

(65) Prior Publication Data
US 2006/0159969 A1 Jul. 20, 2006

(30) Foreign Application Priority Data

Nov. 30, 2004 (JP) ............................. 2004-347668
Sep. 29, 2005 (JP) ............................. 2005-285040

(51) Int. Cl.
*H01M 8/04* (2006.01)
*H01M 8/10* (2006.01)

(52) U.S. Cl. .............................. 429/13; 429/24; 429/26; 429/30

(58) Field of Classification Search ................... 429/13, 429/22, 24, 26, 30
See application file for complete search history.

(56) References Cited

U.S. PATENT DOCUMENTS

| | | | |
|---|---|---|---|
| 5,154,986 A * | 10/1992 | Takechi et al. | 429/24 X |
| 6,329,089 B1 * | 12/2001 | Roberts et al. | 429/13 |
| 6,682,841 B1 * | 1/2004 | Armstrong et al. | 429/26 |
| 6,790,548 B2 * | 9/2004 | Keskula et al. | 429/22 |

FOREIGN PATENT DOCUMENTS

| | | |
|---|---|---|
| JP | 02-126565 | 5/1990 |
| JP | 05-198308 | 8/1993 |
| JP | 2001-167779 | 6/2001 |
| JP | 2002-093448 | 3/2002 |
| JP | 2002-329521 | 11/2002 |
| JP | 2004-185934 | 7/2004 |
| JP | 2004-185938 | 7/2004 |
| JP | 2004-199988 | 7/2004 |
| JP | 2004-296340 | 10/2004 |
| JP | 2004-296384 | 10/2004 |

OTHER PUBLICATIONS

Japanese Notification of Reasons for Refusal, with English Translation, issued in Japanese Patent Application No. JP 2004-347668, dated Mar. 25, 2008.
Japanese Decision of Refusal, w/ English translation thereof, issued in Japanese Patent Application No. JP 2004-347668 dated Jul. 21, 2009.

* cited by examiner

*Primary Examiner*—Stephen J. Kalafut
(74) *Attorney, Agent, or Firm*—McDermott Will & Emery LLP (57) ABSTRACT

This cathode-side humidification tank 1038 also functions as a coolant tank. The water in the cathode-side humidification tank 1038 cools the fuel cell 1030 and returns to the cathode-side humidification tank 1038. In the foregoing situations where the fuel cell 1030 is low in temperature, such as during the startup of the fuel cell system 1100, the coolant warmed by the heat exchanger HEX05 can also be supplied to the fuel cell 1030 to warm up the fuel cell 1030. Moreover, a coolant channel 1040 for supplying a coolant to a cooling plate 1036 provided in the fuel cell 1030 is in connection with a heat exchanger HEX06 which is formed in an anode-side humidification tank 1042. Consequently, the coolant even plays the role of maintaining the cathode-side humidification tank 1038 and the anode-side humidification tank 1042 in almost the same temperatures.

7 Claims, 9 Drawing Sheets

FUEL CELL SYSTEM

BACKGROUND OF THE INVENTION

1. Field of the Invention

The invention relates to a fuel cell system.

2. Description of the Related Art

Solid polymer type fuel cells have a fuel cell stack which is formed by laminating a plurality of cells (membrane electrode assemblies) and fastening them between end plates with through bolts. The cells are each composed of a solid polymer electrolyte membrane, an anode integrally joined to one side of the membrane, and a cathode integrally joined to the other side. The cells, when laminated, are each interposed between a plate that has a fuel channel of concave groove shape in its side facing toward the anode and a plate that has an oxidant channel of concave groove shape in its side facing toward the cathode. Fuel (hydrogen or reformed gas chiefly containing hydrogen) is then passed through the fuel channel, and an oxidant (air, typically) through the oxidant channel, so that an electrochemical reaction occurs via the solid polymer electrolyte membrane to generate electric power.

In such solid polymer type fuel cells, the solid polymer electrolyte membranes function properly when in a saturated humidity condition. Thus, the reactant gas(es) (fuel and/or oxidant) is/are humidified in a humidifier or the like before passed through the channels of the plates, whereby the solid polymer electrolyte membranes are maintained in the saturated humidity condition. The solid polymer type fuel cells have operating temperatures of approximately 80° C., whereas the electrochemical reaction, an exothermic reaction, can cause a rise in temperature during power generation. To avoid this, fuel cell stacks typically incorporate cooling plates, through the channels of which a coolant is circulated to maintain the fuel cell stacks within the operating temperatures.

In conventional fuel cell systems for operating a solid polymer type fuel cell, the coolant flow has been stopped in a system stopping process (see Japanese Patent Laid-Open Publication No. 2004-296340).

When the coolant flow is stopped in a system stopping process and the fuel cell stack is let to cool down naturally, the fuel cell stack starts to cool from outside. This causes temperature differences inside the fuel cell stack. Since water vapor in the fuel cell stack starts to condense at locations of lower temperatures, the individual cells vary in the water distribution in the process of natural cooling. As a result, the distribution of the reactant gases to the cells at the next startup becomes uneven, thereby making the cell voltages during power generation unstable. This may cause shortage of reactant gas and degradation of some cells. In some cases, cells are prevented from starting properly and the operation thereof is stopped when a protective function is activated. Besides, when the fuel humidifier or air humidifier pipe-connected has a temperature (water temperature) higher than the cell temperature, vapor can diffuse from the fuel humidifier or air humidifier into the cells and condense in the cells even if the reactant gas flows are stopped. This also changes the water distribution in the cells. Similarly, the distribution of the reactant gases to the cells at the next startup may become uneven, thereby degrading the cell and stopping the system.

SUMMARY OF THE INVENTION

The present invention has been achieved in view of the foregoing problems. It is thus an object of the present invention to provide a technology for stabilizing the output of a fuel cell system at startup.

One of the aspects of the present invention is a fuel cell system comprising: a fuel cell stack including a laminate formed by combining a membrane electrode assembly composed of an electrolyte membrane, an anode jointed to one side of the electrolyte membrane, and a cathode joined to the other side of the electrolyte membrane, with a fuel channel plate having a fuel channel for supplying a fuel to the anode, an oxidant channel plate having an oxidant channel for supplying an oxidant to the cathode, and a heat-medium channel plate having a heat-medium channel for a heat medium to flow through; a unit which cools the heat medium exhausted from the fuel cell stack before putting the heat medium into the fuel cell stack for circulation; a fuel humidifying unit which humidifies the fuel by heat exchange with the heat medium; an oxidant humidifying unit which humidifies the oxidant by heat exchange with the heat medium; and a control unit which stops power generation of the fuel cell in a system stopping process while continuing the circulation of the heat medium until a predetermined cooling stop condition holds.

It should be noted that the fuel channel plate, the oxidant channel plate, and the heat-medium channel plate need not necessarily be separate members. For example, the fuel channel may be formed in one side of a plate, and the heat-medium channel in the other side of the same. This configuration that the fuel channel plate and the heat-medium channel plate are realized by one single member shall also be covered by the present invention.

According to the foregoing configuration, the heat medium is circulated through the fuel cell stack even after the system stopping process is started. This suppresses the occurrence of variations in the temperature distribution in individual cells, thereby suppressing variations in the water distribution in the cells. As a result, the amounts of power generated by the respective cells become uniform at the next startup, thereby achieving stabilized output.

Another aspect of the present invention is a fuel cell system comprising: a fuel cell stack including a laminate formed by combining a membrane electrode assembly composed of an electrolyte membrane, an anode jointed to one side of the electrolyte membrane, and a cathode joined to the other side of the electrolyte membrane, with a fuel channel plate having a fuel channel for supplying a fuel to the anode, an oxidant channel plate having an oxidant channel for supplying an oxidant to the cathode, and a heat-medium channel plate having a heat-medium channel for a heat medium to flow through; a unit which cools the heat medium exhausted from the fuel cell stack before putting the heat medium into the fuel cell stack for circulation; a fuel humidifying unit which humidifies the fuel by heat exchange with the heat medium; an oxidant humidifying unit which humidifies the oxidant by heat exchange with the heat medium; and a control unit which continues the circulation of the heat medium in a system stopping process until a predetermined cooling stop condition holds, and stops power generation of the fuel cell when the predetermined cooling stop condition holds.

According to the foregoing configuration, degradation caused by diffusion and crossover of hydrogen and oxygen in the electrolyte occurring after stopping power generation is suppressed. Moreover, the configuration suppresses the occurrence of variations in the water distribution in individual cells. Therefore, the amounts of power generated by the respective cells become uniform at the next startup, thereby achieving stabilized output.

In the foregoing configuration, the control unit may adjust an amount of circulation of the heat medium so that a difference between a temperature of the heat medium exhausted from the fuel cell stack and a temperature of the heat medium put into the fuel cell stack falls within a predetermined range during a period elapsed since the system stopping process is started until the predetermined cooling stop condition holds. This can make the water distribution in individual cells in the fuel cell stack more uniform.

In the foregoing configuration, the control unit may determine the cooling stop condition to be that a temperature of the heat medium exhausted from the fuel cell stack falls below a value determined as a function of outside air temperature. Alternatively, the control unit may determine the cooling stop condition holds when a predetermined time elapses since the stopping process is started. These conditions make it possible to end the circulation of the heat medium in an appropriate period, thereby allowing a reduction in power consumption.

Incidentally, any appropriate combinations of the foregoing components are also intended to fall within the scope of the invention to be covered by a patent claimed for in this patent application.

DETAILED DESCRIPTION OF THE INVENTION

First Embodiment

Figure 1:
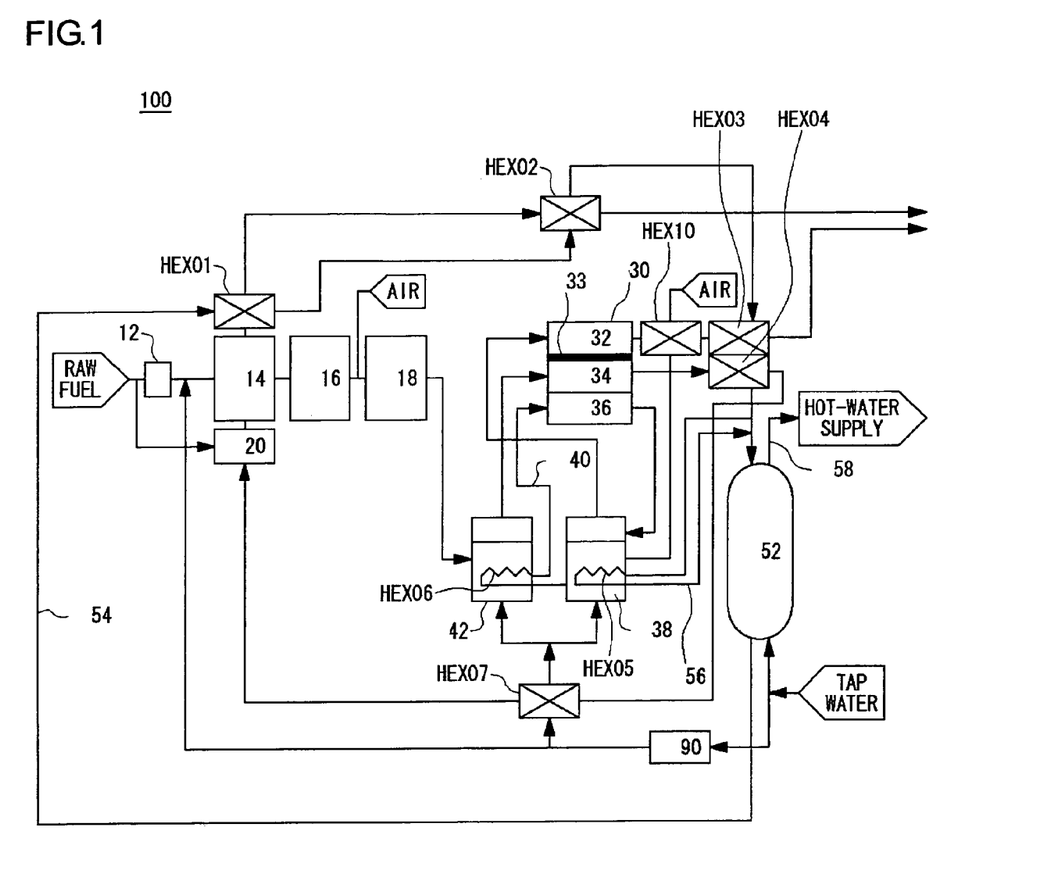
FIG. 1 is a diagram showing the overall configuration of a fuel cell system according to a first embodiment.

Hereinafter, a first embodiment will be described with reference to the drawings. FIG. 1 shows the overall configuration of a fuel cell system 10 according to the first embodiment. The fuel cell system 10 comprises a fuel cell stack 20, a fuel supply unit 30, a fuel humidifier 40, an air supply unit 50, an air humidifier 60, a medium heat exchanger 70, piping 80, a control valve 86, a circulation pump 90, and a control unit 100.

The fuel cell stack 20 includes a laminate formed by combining a membrane electrode assembly with a fuel channel plate, an oxidant channel plate, and a heat-medium channel plate. The membrane electrode assembly is composed of a polymer electrolyte membrane, an anode joined to one side of the membrane, and a cathode joined to the other side of the membrane. The fuel channel plate has a fuel channel for supplying a fuel to the anode, the oxidant channel plate an oxidant channel for supplying an oxidant to the cathode, and the heat-medium channel plate a heat-medium channel for a heat medium to flow through. The fuel cell stack 20 may have a publicly-known configuration. Among typical examples are one shown in FIGS. 1 and 2 of Japanese Patent Laid-Open Publication No. 2004-185938, and one shown in FIG. 1 of Japanese Patent Laid-Open Publication No. 2004-185934. In the fuel cell stack 20 of the present embodiment, the fuel and air to be used for power generation, and the heat medium to be used for cooling the anode and/or the cathode, shall flow in parallel with the direction of the gravitational force. The present embodiment uses water as the heat medium, whereas any other liquid or gas may be used as long as it is capable of exchanging heat. Hereinafter, the water used as the heat medium will be referred to as coolant.

The fuel supply unit 30 is one for supplying hydrogen, the fuel. For example, the fuel supply unit 30 is composed chiefly of a fuel tank, a desulfurizer, and a reforming unit. The fuel tank reserves a hydrocarbon gas such as natural gas and methane gas. The desulfurizer removes sulfur components from the hydrocarbon gas supplied from the fuel tank. The reforming unit reforms the desulfurized hydrocarbon gas to produce hydrogen.

The fuel humidifier 40 humidifies the fuel supplied from the fuel supply unit 30. Specifically, the fuel humidifier 40 includes a fuel humidification tank 42 and a fuel heat exchanger 44. Using water that is reserved in the fuel humidification tank 42 and warmed by the fuel heat exchanger 44, the fuel humidifier 40 humidifies the fuel into a relative humidity of 100% RH by a bubbling method.

The air supply unit 50 is one for supplying air which contains oxygen, the oxidant. For example, the air supply unit 50 consists of a blower for taking in the outside air, and air filters if necessary.

The air humidifier 60 humidifies the air supplied from the air supply unit 50. Specifically, the air humidifier 60 includes an air humidification tank 62. Using water that is reserved in the air humidification tank 62, the air humidifier 60 humidifies the air into a relative humidity of 100% RH by a bubbling method.

The medium heat exchanger 70 lowers the temperature of the coolant exhausted from the fuel cell stack 20 by heat exchange with the outside air or the like. The medium heat exchanger 70 makes it possible to lower the temperature of the coolant exhausted from the fuel cell stack 20 efficiently.

The piping 80 is configured to allow coolant circulation such that the coolant passed through and exhausted from the heat-medium channel in the fuel cell stack 20 is supplied to the heat-medium channel again.

Specifically, the coolant exhausted from the fuel cell stack 20 is initially introduced to the medium heat exchanger 70. At a branch point 82 arranged on the downstream side of the medium heat exchanger 70, the coolant branches between a line toward the fuel humidifier 40 and a line toward the air humidifier 60 in a predetermined distribution ratio. Part of the coolant exhausted from the fuel cell stack 20 flows through the fuel heat exchanger 44 of the fuel humidifier 40. The rest of the coolant exhausted from the fuel cell stack 20 is supplied directly to the air humidifier 60. The coolant passed through the fuel heat exchanger 44 merges with the coolant that flows the foregoing line toward the air humidifier 60, at a merging point 84 on the upstream side of the air humidifier 60. The merged coolant flows through the air humidification tank 62 of the air humidifier 60 before it is exhausted from the air humidifier 60. The circulation pump 90 pumps up the coolant exhausted from the air humidifier 60 to feed a predetermined amount of the coolant into the fuel cell stack 20.

The control valve 86 has a variable opening, and is arranged between the branch point 82 and the merging point 84. The opening of the control valve 86 can be adjusted to correct the distribution ratio of the coolant. Incidentally, the control valve 86 is not absolutely necessary. It is dispensable if the distribution ratio of the coolant need not be corrected depending on the operating condition.

The control unit 100 controls the amount of electric power generated by the fuel cell stack 20, as well as controls the flow rate of the coolant by adjusting the opening of the control valve 86 and the circulation pump 90. The control unit 100 also controls the amount of fuel supplied from the fuel supply unit 30 and the amount of air supplied from the air supply unit 50 if necessary.

(Operation in a System Stopping Process)

Description will now be given of the operation of the fuel cell system 10 in a system stopping process. In the following description, the temperature near a coolant inlet formed in the fuel cell stack 20 will be referred to as coolant inlet temperature (T1), and the temperature near a coolant outlet formed in the fuel cell stack 20 as coolant outlet temperature (T2). Moreover, the temperature of the fuel humidified in the fuel humidifier 40 will be referred to as humidified fuel temperature (T3), and the temperature of the air humidified in the air humidifier 60 as humidified air temperature (T4). Furthermore, the dew point near a fuel inlet formed in the fuel cell stack 20 will be referred to as fuel dew point (T5), and the dew point near an air inlet formed in the fuel cell stack 20 as air dew point (T6). Incidentally, T1, T2, T3, T4, T5, and T6 are measured by not-shown temperature sensors according to need. The measurements are transmitted to the control unit 100.

In a system stopping process, the control unit 100 interrupts the load current and stops power generation in the fuel cells while maintaining the circulation of the coolant by the circulation pump 90. The coolant circulation is continued until a cooling stop condition to be described later holds. Next, the control unit 100 stops the fuel supply from the fuel supply unit 30 and the air supply from the air supply unit 50. Either of the fuel supply and the air supply may be stopped first. Both may be stopped at the same time. After stopping power generation of the fuel cell, the control unit 100 determines whether or nor the cooling stop condition holds. An example of the cooling stop condition is that any of the cell temperature, the coolant outlet temperature (T2), the humidified fuel temperature (T3), and the humidified air temperature (T5) reaches a set temperature. Here, the set temperature is determined, for example, as a function of the outside air temperature such as (the outside air temperature+5)° C. Otherwise, a lapse of a predetermined time after stopping power generation of the fuel cell may be used as the cooling stop condition. Since the coolant circulation is stopped when such a cooling stop condition holds, it is possible to make the water distribution in individual cells uniform and reduce the power consumption as well.

Incidentally, the control unit 100 may adjust the flow rate of the coolant by using the circulation pump 90 so that a difference between the coolant outlet temperature (T2) and the coolant inlet temperature (T1) falls within, e.g., 2° C. during the coolant circulation after stopping power generation of the fuel cell. This can make the temperature distribution within the fuel cell stack 20 smoother in the direction of flow of the coolant, thereby reducing the possibilities of differences in the water distribution in the cells.

Figure 2:
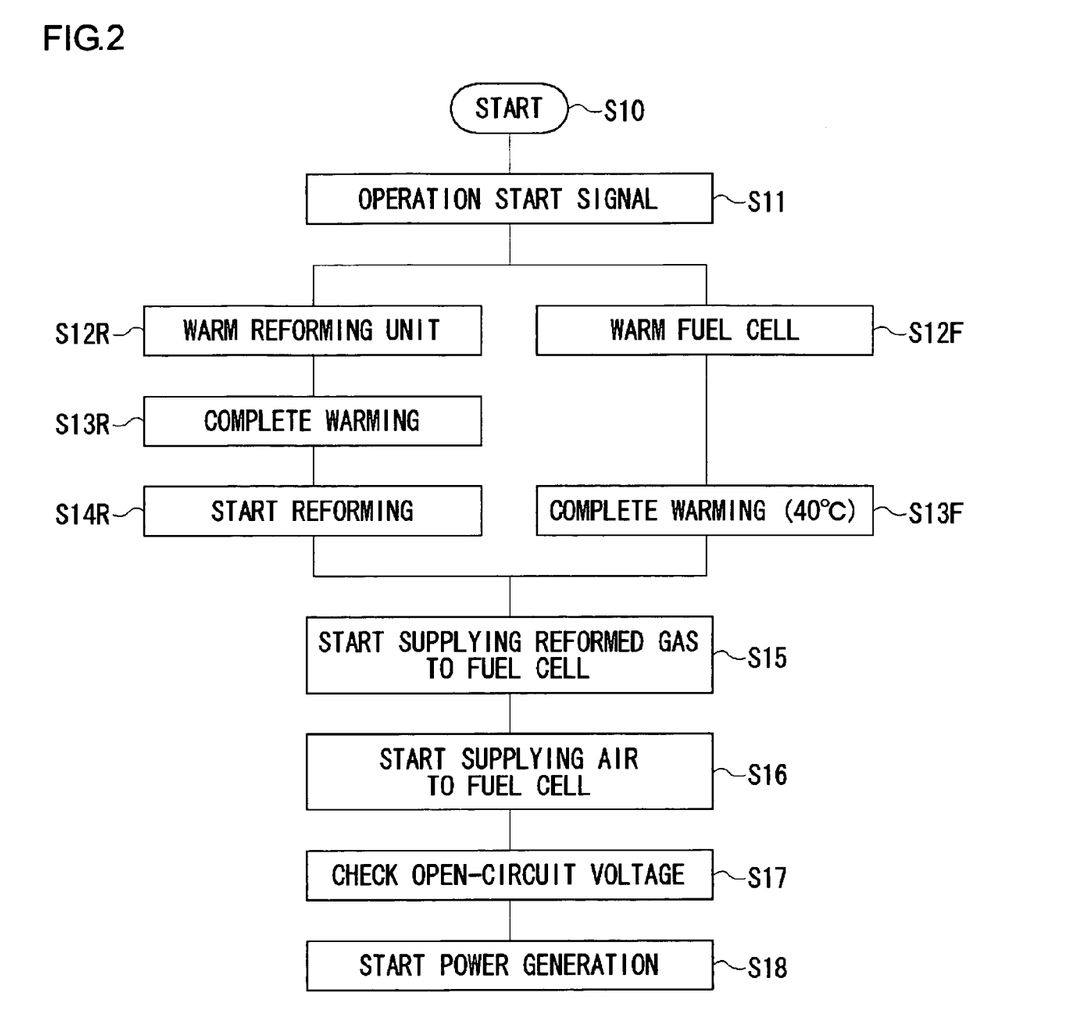
FIG. 2 is a graph showing temperature variations during forced cooling.
Figure 3:
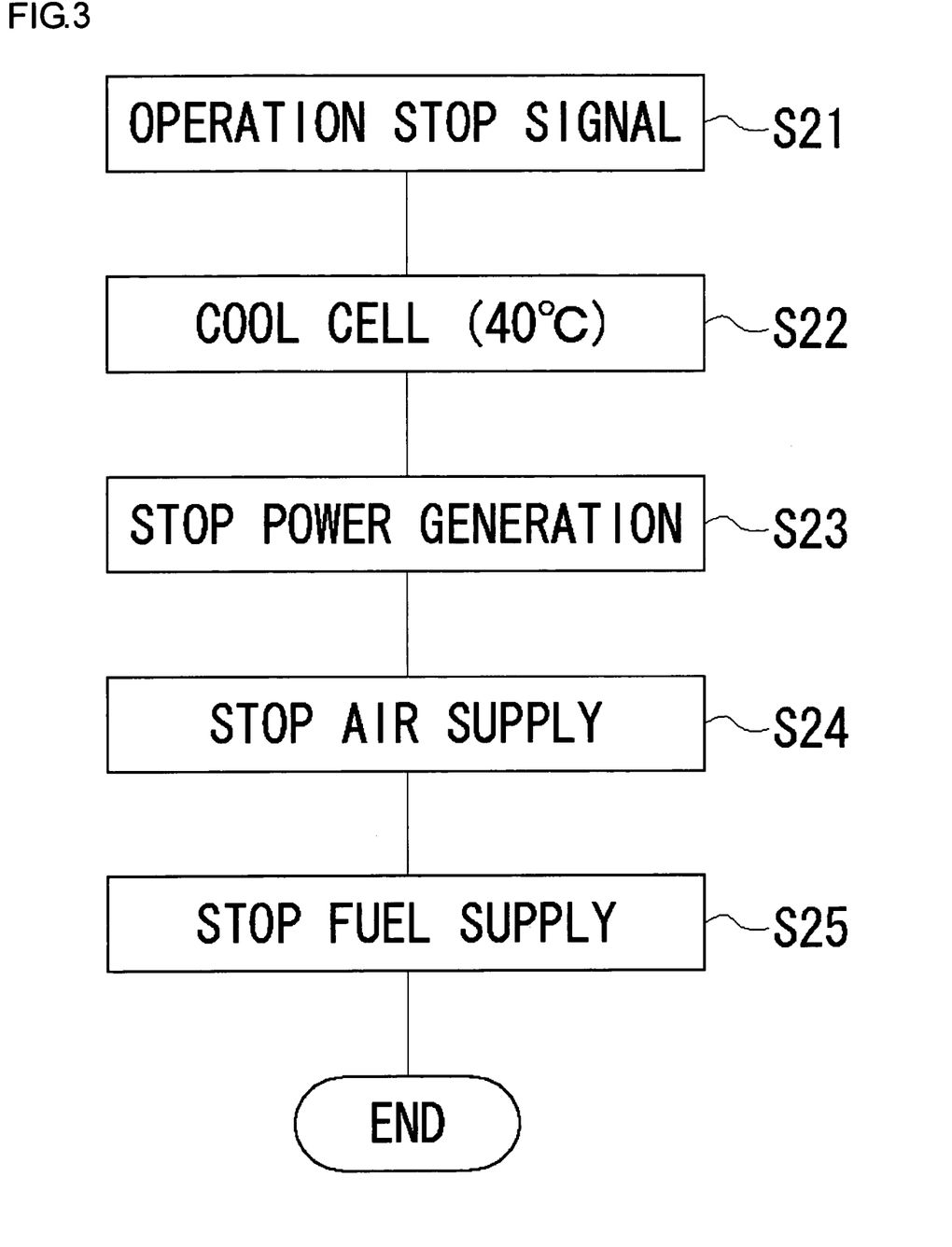
FIG. 3 is a graph showing temperature variations during natural cooling (comparative example)

FIG. 2 is a graph showing temperature variations when the coolant circulation is continued after stopping power generation of the fuel cell (hereinafter, referred to as forced cooling). FIG. 3 is a graph showing temperature variations (comparative example) when the coolant circulation is stopped simultaneously with the stopping of power generation of the fuel cell (hereinafter, referred to as natural cooling). The temperatures were measured at a total of four points, i.e., at two locations on the cell surface, at the surface of the fuel humidifier 40, and at the surface of the air humidifier 60. It is shown from the result that during forced cooling, the temperatures quickly fell to or below 40° C. without variations in one hour since the stopping of power generation of the fuel cell. In contrast, it can be seen that during natural cooling, the temperatures stayed at or above 40° C. with variations even after a lapse of four hours or more since the system stopping process is started.

Figure 4:
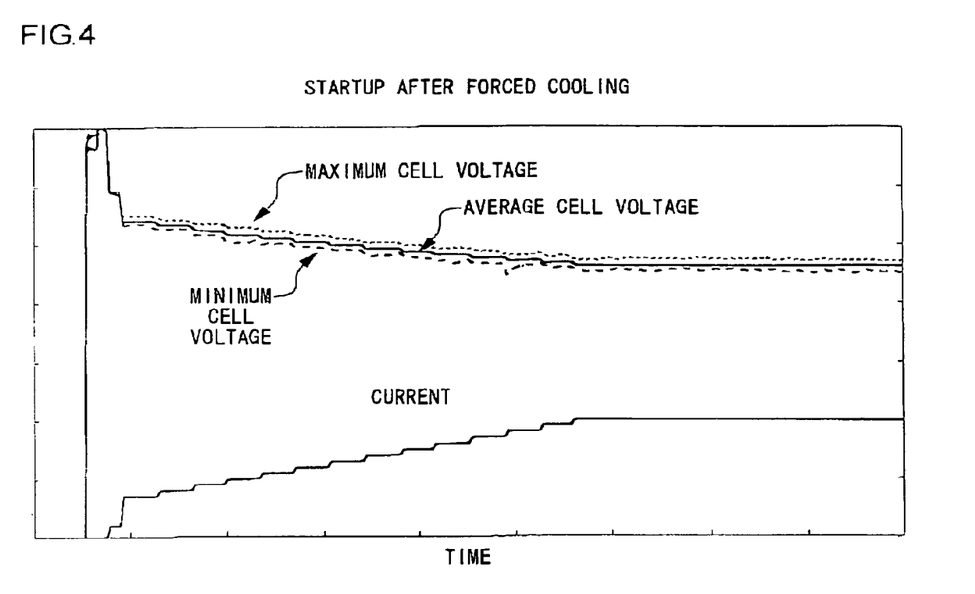
FIG. 4 is a graph showing variations in the cell current and in the voltages of the cells when the system is started after forced cooling.
Figure 5:
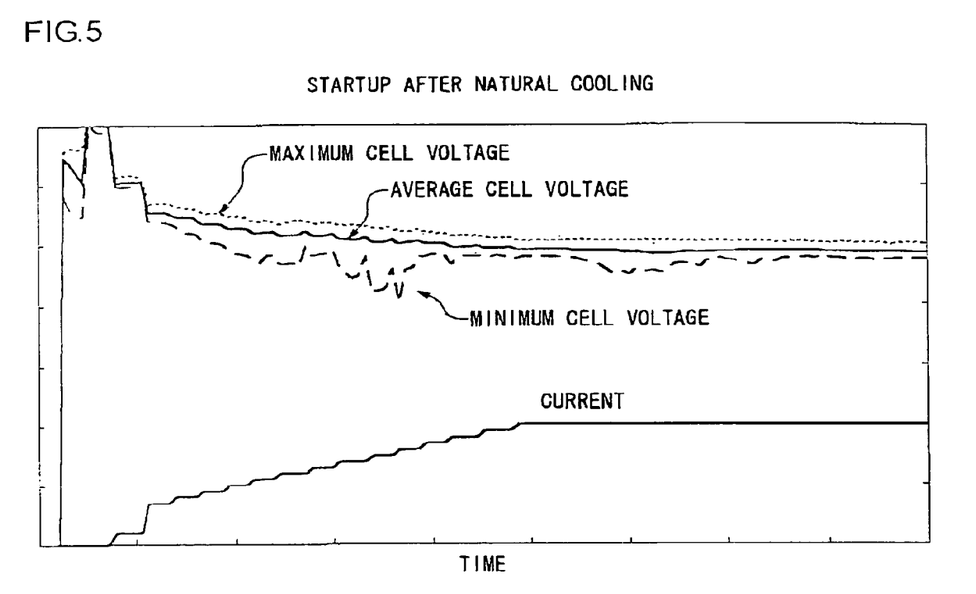
FIG. 5 is a graph showing variations in the cell current and in the voltages of the cells when the system is started after natural cooling (comparative example)

FIG. 4 is a graph showing variations in the cell current and in the voltages of the cells when the system is started after forced cooling. FIG. 5 is a graph showing variations in the cell current and in the voltages of the cells when the system is started after natural cooling (comparative example). When the system is started after natural cooling, the cell voltages show considerable variations. During natural cooling, the fuel cell stack 20 cools down gradually from the outside, so that temperature differences occur inside the fuel cell stack 20. Since water vapor in the fuel cell stack 20 starts to condense at locations of lower temperatures, the cells vary in the water distribution in the process of natural cooling. This makes the distribution of the reactant gas to the cells uneven at the next startup, thereby making the cell voltages at the time of power generation unstable. When the fuel humidifier 40 or the air humidifier connected with the piping 80 has a temperature (water temperature) higher than the cell temperature, vapor diffuses from the fuel humidifier 40 or the air humidifier 60 to the fuel cell stack 20 and condenses in the fuel cell stack 20 even if the reactant gas flows are stopped. This also changes the water distribution inside the fuel cell stack 20.

In contrast, when the system is started after forced cooling, the cell voltages do not exhibit variations such as seen in the comparative example. It is thus shown that the output is stable. The reason seems that the coolant circulation continued even after the stopping of power generation of the fuel cell suppresses the occurrence of temperature variations in the fuel cell stack 20 in the process of cooling, thereby making the water distribution in the fuel cell stack 20 uniform. Moreover, since the circulation of the coolant is continued even after the stopping of power generation of the fuel cell, the fuel cell stack 20 and the fuel humidifier 40 or air humidifier 60 make similar transitions in temperature. This suppresses the diffusion of vapor from the fuel humidifier 40 or air humidifier 60 to the fuel cell stack 20, thereby contributing to the stabilized output.

The present embodiment is not limited to the foregoing one, and various modifications including design changes may be made thereto based on the knowledge of those skilled in the art. All such modifications are also intended to fall within the scope of the present embodiment.

For example, in the foregoing embodiment, the cooling step is started after power generation is stopped. Alternatively, the cooling step may be started before stopping power generation so that power generation is stopped when the temperature of the fuel cell is lower than a normal power generation temperature of the fuel cell and the circulation of the coolant is stopped when a predetermined cooling stop condition holds. In another alternative approach, power generation may be stopped and the circulation of the coolant is stopped when a predetermined cooling condition holds. In this case, if the output from the fuel cell occurring when the system stopping process is started is relatively large, time required for cooling is reduced by cooling the system while lowering the output. In the foregoing embodiment, the supply of fuel and air is interrupted after stopping power generation. Alternatively, for reduction in the amount of residual oxygen in the cathode, the amount of air supplied may be reduced so as to increase air utilization factor, before stopping power generation, or the supply of air may be stopped before stopping power generation. In another approach adapted to increase carbon monoxide concentration in the anode, the amount of fuel supplied to the fuel cell may be reduced so as to increase fuel utilization factor, before stopping power generation, or the supply of fuel is stopped before stopping power generation, whereupon the supply of air may be stopped. In yet another approach, both air utilization factor and fuel utilization factor may be increased before stopping power generation, or both the supply of air and the supply of fuel may be stopped before stopping power generation. By employing these methods, degradation due to crossover in the reactant gas occurring after stopping power generation is suppressed so that the durability of the fuel cell is increased and output stability is improved. Whichever method is employed, it is desirable that power generation is stopped when the voltage of at least one cell or the voltage of a cell block comprising a plurality of cells reaches a predetermined value or below, in order to protect the cells.

According to the present embodiment described above, it is possible to improve the output stability of the fuel cell system at startup.

Second Embodiment

Field of the Present Embodiment

The present embodiment relates to a method for operating a fuel cell system, and more particularly to a method for operating a fuel cell system for preventing degradation of fuel cells which is ascribable to start-stop cycles.

Background Art

Even in this age of worldwide diversification of such new technologies as IT and biotechnology, the energy industry remains one of the biggest key industries. With the recent permeation of environmental concerns including the prevention of global warming, expectations for so-called new energy resources have been growing. The new energy resources are capable of distributed power generation at locations in proximity to electricity consumers. Aside from their environmental friendliness, the new energy resources are thus advantageous in terms of transmission loss and power-supply security. The development of the new energy resources can also yield a side effect of creating new peripheral industries. The new energy resources started being addressed in earnest since the oil crisis near 30 years ago. Today, such energy resources as renewable energy resources including photovoltaic power generation, recycled energy resources including waste power generation, high-efficiency energy resources including fuel cells, and new fields of energy resources typified by clean energy vehicles, are in the phase of development toward practical use.

Of these, fuel cells are one of the most remarkable energy resources in the industry. Fuel cells generate electric power and heat simultaneously through the chemical reaction between oxygen in the air and hydrogen that is created by reacting natural gas, methanol, or the like with water vapor. The fuel cells thus generate power with a by-product of water alone, at high efficiencies even in lower output ranges. The power generation is also stable, being unaffected by weather. In particularly, solid polymer type fuel cells are considered as one of the standards of the next-generation power sources for such uses as stationary applications including in residential buildings, as well as car-mounted and mobile applications.

Problems to be Solved by the Present Embodiment

In such stopping methods as described in Japanese Patent Laid-Open Publication No. 2002-093448, a fuel cell system is stopped by stopping the supply of oxygen-containing gas while cells are operated to generate power to consume oxygen on the cathode side. This oxygen consumption processing has been performed to improve the durability of the fuel cell. In this method, however, hydrogen may diffuse from the anode to the electrolyte layer while the fuel cell is rested in storage. Besides, protons diffusing through the electrolyte layer may be reduced by a current (leak current) that flows due to a short circuit formed via the coolant or like, thereby generating hydrogen in the cathode. The generated hydrogen and residual oxygen can thus possibly react with each other to generate hydrogen peroxide as shown by the formula (1), or cause combustion reaction as shown by the formula (2). Hydrogen peroxide has an electrolyte-decomposing action. The combustion reaction degrades the catalysts and electrolyte, thereby causing degradation of the fuel cell.

$$H_2 + O_2 \rightarrow H_2O_2 \qquad (1)$$

$$H_2 + \tfrac{1}{2} * O_2 \rightarrow H_2O \qquad (2)$$

In such stopping and storing methods as described in Japanese Patent Laid-Open Publication Nos. 2002-093448 and 2005-071778, the cathode is purged with inactive gas while the fuel cell system is at rest. This requires a unit which supplies the inactive gas to the fuel cell, thereby causing the problem of greater system size.

The present embodiment has been achieved in view of the foregoing problems. It is thus an object of the present embodiment to avoid degradation of a fuel cell which is ascribable to start-stop cycles without adding a new unit (device) but by improving the method for operating the fuel cell system.

To achieve the foregoing object, one of the aspects of the present embodiment provides a method for operating a fuel cell system comprising a reforming unit which reforms a raw fuel into a hydrogen-containing fuel, and a fuel cell which generates electric power from the fuel. The method comprises supplying the fuel rich in carbon monoxide to the fuel cell when starting the fuel cell system. Here, the raw material shall refer to a fuel of hydrocarbon type or the like, containing hydrogen atoms. Specific examples include LPG and manufactured gas delivered to general households, and alcohols such as methanol.

According to the foregoing aspect, the fuel having a high carbon monoxide concentration is supplied to the anode of the fuel cell. Carbon monoxide is thus adsorbed by catalysts of the anode (platinum in particular), thereby hindering the generation of protons from the anode. Consequently, it is possible to suppress the generation of hydrogen in the cathode which is ascribable to a leak current, and by extension the direct reaction of hydrogen and oxygen and the generation of hydrogen peroxide when an oxidant is supplied to the cathode. As a result, degradation of the fuel cell can be avoided.

The foregoing aspect may also include starting power generation of the fuel cell at a temperature lower than a normal power generation temperature of the fuel cell. For example, the fuel cell has a normal power generation temperature of 70° C. to 80° C. if it is a solid polymer type fuel cell. The temperature lower than the normal power generation temperature is considered appropriate to be at least 10° C. lower, or 60° C. and below, and desirably 45° C. and below.

According to the present embodiment, low temperatures of the fuel cell increase the coverage of the catalysts with carbon monoxide and decrease the catalytic activity when the fuel is supplied. This suppresses the generation of hydrogen in the cathode which is ascribable to a leak current. Moreover, the low temperatures of the fuel cell decrease the rates of diffusion of hydrogen and oxygen in the electrolyte, thereby suppressing crossover. The low temperatures of the fuel cell also decrease the reaction rates during the generation of hydrogen peroxide and the combustion reaction. Consequently, the effect of the foregoing aspect can be enhanced further.

To achieve the foregoing object, another aspect of the present embodiment provides a method for operating a fuel cell system. The method comprises: when stopping the fuel cell system, cooling the fuel cell to a temperature lower than a normal power generation temperature of the fuel cell; and stopping power generation of the fuel cell, following the cooling of the cell. Here, in case of solid polymer type fuel cell, the normal power generation temperature of the solid polymer type fuel cell is 70° C. to 80° C. The temperature lower than the normal power generation temperature thus refers to a temperature at least 10° C. lower, or 60° C. and below, and desirably 45° C. and below.

According to the foregoing aspect, when stopping the fuel cell system, the fuel cell is cooled down before the power generation of the fuel cell is stopped. It is therefore possible to suppress hydrogen and oxygen from diffusing in the electrolyte, and causing crossover after the power generation is stopped. As a result, degradation of the fuel cell can be avoided.

The operation method according to the foregoing aspect may be one for operating a fuel cell system including a reforming unit which reforms a raw fuel into a hydrogen-containing fuel and a fuel cell which generates electric power from the fuel, the method comprising: when stopping the fuel cell system, supplying the fuel rich in carbon monoxide to the fuel cell; cooling the fuel cell to a temperature lower than a normal power generation temperature of the fuel cell; and stopping power generation of the fuel cell, following the cooling of the cell.

According to this aspect, when stopping the fuel cell system, the fuel having a high carbon monoxide concentration is supplied to the anode. Since carbon monoxide is adsorbed to the catalysts of the anode, oxygen that flows into the anode while the fuel cell system is stopped, if any, is consumed to oxidize the catalyst-adsorbed carbon monoxide. This can suppress a rise in the potential of the anode, thereby avoiding degradation of the catalysts, or oxidation of ruthenium in particular. In addition, carbon monoxide adsorbed to the anode catalysts, or platinum in particular, can hinder the generation of protons in the anode. This makes it possible to suppress the generation of hydrogen in the cathode which is ascribable to a leak current, and by extension the direct reaction of hydrogen and oxygen and the reaction of generating hydrogen peroxide when oxygen flows into the cathode. As a result, degradation of the fuel cell can be avoided.

Another aspect of the present invention relates to a method for operating a fuel cell system, comprising, when stopping the fuel cell system: stopping power generation of the fuel cell; cooling the fuel cell to a temperature lower than a normal power generation temperature of the fuel cell, following the stopping of power generation. Here, in case of solid polymer type fuel cell, the normal power generation temperature is 70° C. and 80° C. The temperature lower than the normal power generation temperature is considered appropriate to be at least 10° C. lower, or 60° C. and below, and desirably 45° C. and below.

According to this aspect, when the fuel cell system is stopped, the fuel cell is not allowed to cool naturally after stopping power generation. Instead, the fuel cell is subject to forced cooling. Therefore, diffusion and crossover of hydrogen and oxygen in the electrolyte occurring after stopping power generation is suppressed. As a result, degradation of the fuel cell is avoided.

Another aspect of the present invention relates to a method for operating a fuel cell system comprising a reforming unit, which reforms a raw fuel into a hydrogen-containing fuel, and a fuel cell which generates electric power from the fuel, the method comprising, when stopping the fuel cell system: supplying the fuel richer in carbon monoxide than in a normal operation to the fuel cell; stopping power generation of the fuel cell; and cooling the fuel cell to a temperature lower than a normal power generation temperature of the fuel cell, following the stopping of power generation.

According to this aspect, the fuel rich in carbon monoxide is supplied to the anode when stopping the fuel cell system. Therefore, the carbon monoxide is adsorbed in the catalysts of the anode. Thus, even if air flows into the anode in a period since the beginning of the stopping process and elapsed until the system is started next time, oxygen in the air is consumed to oxidize carbon monoxide adsorbed in the catalysts. This can suppress a rise in the potential of the anode, thereby avoiding degradation of the catalysts, or oxidation of ruthenium in particular. Carbon monoxide is adsorbed in the catalysts (platinum in particular) of the anode, whereby the generation of protons in the anode is hindered. Consequently, it is possible to suppress the generation of hydrogen in the cathode which is ascribable to a leak current, and by extension the direct reaction of hydrogen and oxygen and the reaction of generating hydrogen peroxide when air is supplied to the cathode. As a result, degradation of the fuel cell is avoided.

Figure 6:
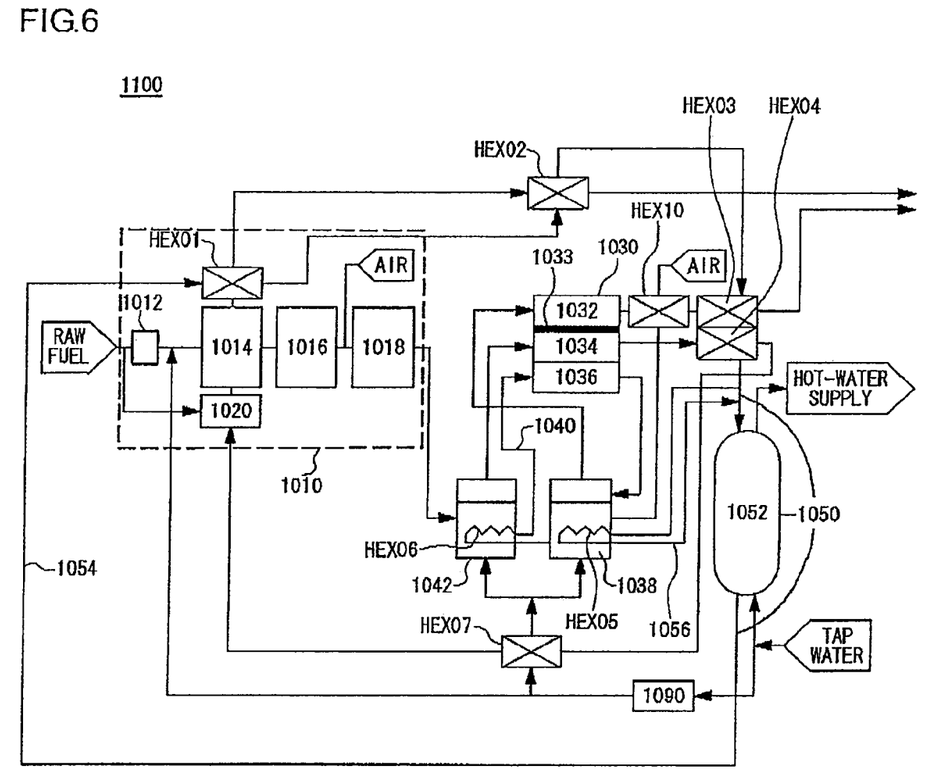
FIG. 6 is a system block diagram schematically showing the configuration of a fuel cell system according to a second embodiment.

Now, the method for operating a fuel cell system according to the present embodiment will be described with reference to the drawing. FIG. 6 is a system block diagram schematically showing the configuration of a fuel cell system 1100.

The fuel cell system 1100 is a cogeneration system having both a power generation function and a hot-water supply function, and comprises a reforming unit 1010, a fuel cell 1030, and a hot-water storing unit 1050. The reforming unit 1010 reforms a raw fuel (hydrocarbon fuel), such as LPG and manufactured gas, to produce reformed gas having a hydrogen (fuel) content of approximately 80%. The fuel cell 1030 generates power from the reformed gas supplied from the reforming unit 1010 and oxygen (oxidant) in the air. The hot-water storing unit 1050 recovers the heat occurring from such components as the reforming unit 1010 and the fuel cell 1030 in the form of hot water (water of 40° C. and above).

Such raw fuels as LPG and manufactured gas delivered to general households are typically odorized with sulfides for safety measures against gas leak. Since these sulfides can degrade catalysts in the reforming unit 1010, the reforming unit 1010 initially removes these sulfides contained in the raw fuel with a desulfurizer 1012. The raw fuel desulfurized by the desulfurizer 1012 is then mixed with water vapor, steam-reformed by a reformer 1014, and introduced to a transformer 1016. The transformer 1016 produces reformed gas having a hydrogen content of approximately 80%, a carbon dioxide concentration of approximately 20%, and a carbon monoxide concentration of not higher than 1%. This fuel cell system 1100 supplies the reformed gas to the fuel cell 1030 which is operated at low temperatures (100° C. and below) where carbon monoxide has a high impact. The reformed gas is thus mixed with oxygen further, and carbon monoxide is oxidized selectively in a CO remover 1018. The CO remover 1018 can be used to lower the carbon monoxide concentration of the reformed gas to or below 10 ppm.

The reforming unit 1010 includes at least the reformer 1014 and the transformer 1016. It shall further include the desulfurizer 1012 if the gases delivered to general households are used as the raw fuel as with this fuel cell system 1100, and the CO remover 1018 if the fuel cell 1030 is of low-temperature type such as a solid polymer type fuel cell.

Since the steam reforming is an endothermic reaction, the reformer 1014 is provided with a burner 1020. When starting the reforming unit 1010, the raw fuel is also supplied to this burner 1020 to warm the reformer 1014. As will be detailed later, after the fuel cell system 1100 reaches stable operation, the supply of the raw fuel to the burner 1020 is stopped. The unreacted fuel exhausted from the fuel cell 1030 is then supplied to burner 1020 to supply heat to the reformer 1014. Having supplied heat to the reformer 1014 via the burner 1020, the exhaust air still has a large amount of heat. This exhaust air is thus introduced to heat exchangers HEX01 and HEX02 to exchange heat with the water in a hot-water tank 1052. The water then exchanges heat with the gas exhausted from a cathode 1032 (HEX03), and further exchanges heat with the gas exhausted from an anode 1034 (HEX04) before returning to the hot-water tank 1052. Water piping 1054 that runs through these heat exchangers HEX01, HEX02, HEX03, and HEX04 has a branch pipe 1056 so that the temperature of the water (hot water) past the heat exchanger HEX04 can be utilized for warming or cooling in a cathode-side humidification tank 1038. In situations where the cathode-side humidification tank 1038 is low in temperature, such as at the startup of the fuel cell system 1100, the water past the heat exchanger HEX04 is led to the branch pipe 1056. The water then supplies heat to the cathode-side humidification tank 1038 via a heat exchanger HEX05 before returning to the hot-water tank 1052.

This cathode-side humidification tank 1038 also functions as a coolant tank. The water in the cathode-side humidification tank 1038 cools the fuel cell 1030 and returns to the cathode-side humidification tank 1038. In the foregoing situations where the fuel cell 1030 is low in temperature, such as during the startup of the fuel cell system 1100, the coolant warmed by the heat exchanger HEX05 can also be supplied to the fuel cell 1030 to warm up the fuel cell 1030. Moreover, a coolant channel 1040 for the coolant to flow through is in connection with a heat exchanger HEX06 which is formed in an anode-side humidification tank 1042. Consequently, the coolant even plays the role of maintaining the cathode-side humidification tank 1038 and the anode-side humidification tank 1042 in almost the same temperatures.

The reformed gas from the reforming unit 1010 is humidified (bubbled, in the case of this fuel cell system 1100) in the anode-side humidification tank 1042, and supplied to the anode 1034. The unreacted fuel, not involved in the power generation in the anode 1034, is exhausted from the fuel cell 1030 and supplied to the burner 1020. This fuel cell 1030 is typically operated to generate power at temperatures of 70° C. to 80° C., and the exhaust gas exhausted from this fuel cell still has heat of around 80° C. After the heat exchange in the heat exchanger HEX04 as described above, the exhaust gas is thus further introduced to a heat exchange HEX07 to warm the water to be supplied to the cathode-side humidification tank 1038 and the anode-side humidification tank 1042, before supplied to the burner 1020.

The cathode-side humidification tank 1038 and the anode-side humidification tank 1042 are desirably supplied with clean water that has low conductivity and contains little organic contamination. For this reason, tap water is processed with a reverser osmosis membrane and ion-exchange resin in a water processing unit 1090, before supplied to the tanks. This processed water is also used for the steam reforming in the reformer 1014. Tap water is also supplied to, from below, the hot-water tank 1052. The water piping 1054 also takes from below the hot-water tank 1052 the low-temperature water, and returns to the top the water that has exchanged heat in the heat exchangers.

HEX10 represents a total heat exchanger. The exhaust gas containing unreacted oxygen, not involved in the power generation in the cathode 1032, has heat of around 80° C. and contains water produced by the reaction. The total heat exchanger HEX10 supplies the heat and moisture to the air to be supplied to the cathode 1032. The air to be supplied to the cathode 1032 is further humidified (bubbled, in the case of this fuel cell system 1100) in the cathode-side humidification tank 1038 before supplied to the cathode 1032. Meanwhile, the exhaust air, having supplied the heat and moisture in the total heat exchanger HEX10, further exchanges heat with water in the heat exchanger HEX03 before discharged to outside the fuel cell system 1100.

In a conventional method of starting such a fuel cell system 1100, the reforming unit 1010 and the fuel cell 1030 were warmed initially. Then, on condition that the reformed gas exhausted from the CO remover 1018 fell to or below 10 ppm in carbon monoxide concentration and the fuel cell 1030 reached or exceeded 70° C. in temperature, the reformed gas started to be supplied to the fuel cell 1030. The supply of the air was started subsequently. For shutdown, the fuel cell system 1100 stopped the power generation of the fuel cell 1030 immediately after it received a stop signal. Then, the supplies of the air and the reformed gas were stopped in succession.

In the conventional starting method, the reformed gas was supplied to the anode 1034 in the state that the fuel cell 1030 was warmed up to 70° C., the diffusion rate of gas in the electrolyte was high, the coverage of catalysts adsorbing carbon monoxide was low, and the catalytic activity was high. Hydrogen thus turned into protons and moved toward the cathode 1032 while diffusing from the anode to the cathode. Then, if a leak current flowed via the coolant or the like, hydrogen occurred from the cathode 1032. When air was supplied to the cathode 1032 subsequently, the cathode 1032 could cause direct combustion and generate hydrogen peroxide. The conventional starting method thus has had the problem of degradation of the cathode 1032 and a solid polymer membrane 1033. Moreover, the conventional stopping method has had the problem that the cathode 1032 can cause direct combustion and generate hydrogen peroxide as in startup. There has also been another problem that air, or oxygen in particular, can penetrate into the anode 1032 from exterior or from the cathode 1032 to cause direct combustion and generate hydrogen peroxide. In view of this, description will now be given of an operating method for precluding degradation of the fuel cell 1030 when starting the fuel cell system 1100 or in a period since the beginning of the stopping process and elapsed until the system is started next time, in conjunction with practical examples.

PRACTICAL EXAMPLE 1

Figure 7:
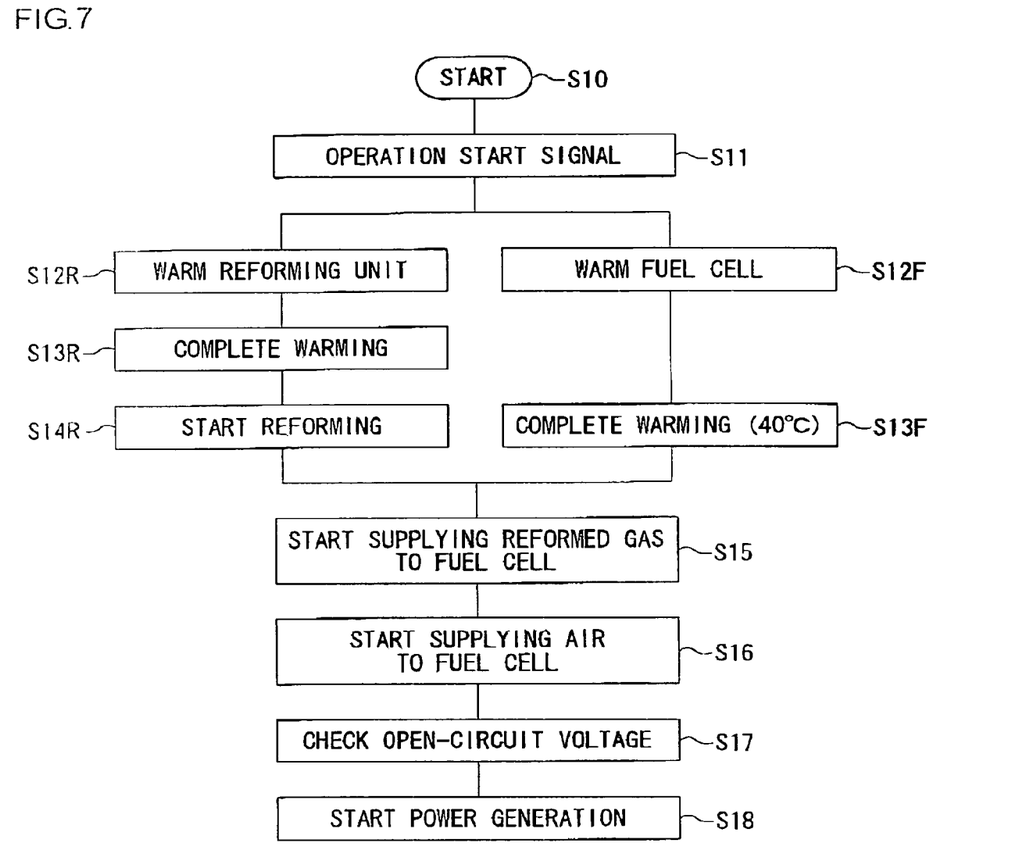
FIG. 7 is a flowchart showing the method of operating a fuel cell system according to practical example 1.

FIG. 7 is a flowchart showing a method of operating (starting) the fuel cell system 1100. As shown in FIG. 7, when an operation start signal is input to the fuel cell system 1100 (S11), the reforming unit 1010 and the fuel cell 1030 start to be warmed up (S12R, S12F). When the reforming unit 1010 completes being warmed (S13R), the reforming unit 1010 starts reforming (S14R). Conventionally, the reformed gas exhausted from the reforming unit 1010 was not supplied to the fuel cell 1030 until it settled down in carbon monoxide concentrations of 10 ppm and less. In the present embodiment, however, after the warming is completed (S13R), the reforming unit 1010 starts reforming (S14R) and starts supplying the reformed gas to the fuel cell 1030 (S15) while the carbon monoxide concentration in the reformed gas is still high (for example, 100 ppm).

Conventionally, the fuel cell was warmed to temperatures of 70° C. and above when the supply of the reformed gas to the fuel cell 1030 was started. In the present embodiment, however, the fuel cell 1030 has only to be warmed to temperatures of 40±10° C. (S13F) when starting supplying the reformed gas to the fuel cell 1030 (S15). Besides, the timing to start warming the fuel cell 1030 (S12F) need not be synchronized with the start of warming of the reforming unit 1010 (S12R).

After the supply of the reformed gas to the fuel cell 1030 is started (S15), air starts being supplied to the fuel cell 1030 (S16). The open circuit voltage is checked (S17) before the power generation by the fuel cell 1030 is started (S18). That is, the fuel cell 1030 starts to generate power at temperatures of 30° C. to 50° C. or so.

When the fuel cell system 1100 is started according to the foregoing flow, the following effects are expected:

(1) The supply of the reformed gas is started at temperatures lower than in normal power generation. This reduces the diffusion rates of hydrogen and oxygen into the electrolyte (the solid polymer membrane 1033 or the electrolyte included in the cathode 1032 and the anode 1034), thereby suppressing crossover.

(2) Before the fuel cell 1030 starts power generation, the reformed gas having a carbon monoxide concentration higher than in its ordinary composition is supplied to the anode 1034. Carbon monoxide is thus adsorbed to the catalysts (platinum in particular) of the anode 1034, whereby the generation of protons in the anode 1034 is hindered. Consequently, it is possible to suppress the generation of hydrogen in the cathode 1032 which is ascribable to a leak current, and by extension the direct reaction of hydrogen and oxygen and the reaction of generating hydrogen peroxide when air is supplied to the cathode 1032.

(3) When the fuel cell 1030 starts power generation, the anode 1034 rises in potential and oxidizes carbon monoxide. This eliminates the need for the operation of removing the adsorbed carbon monoxide. Besides, heat occurs from the increasing excess voltage and the oxidation reaction of carbon monoxide, thereby contributing to an increase in the rate of warming of the cell.

(4) The voltage may become unstable due to the effect of carbon monoxide. In that case, a small amount of air can be added to the reformed gas when starting the power generation of the fuel cell 1030, so that carbon monoxide adsorbed to the surfaces of the catalysts of the anode 1034 is oxidized for improved stability.

(5) The concentration of carbon monoxide contained in the reformed gas can be increased by at least one of the following measures: reducing the amount of air supplied to the CO remover 1018; decreasing the temperature of the CO remover 1018; increasing the temperature of the transformer 1016; decreasing the temperature of the reformer 1014; and reducing the ratio of the amount of raw fuel to the amount of water vapor (S/C) supplied to the reformer 1014. It is also possible to utilize high carbon monoxide concentrations that appear after the completion of warming of the reforming unit 1010 until a stable condition is reached. To prevent the reforming unit 1010 from losing thermal balance, the measures for increasing the carbon monoxide concentration may be changed periodically.

An alternative method is to reduce the amount of fuel supplied to the fuel cell so as to increase fuel utilization factor. By increasing fuel utilization factor, the amount of unreacted fuel combusted in the burner 1020 of the reforming unit 1014 is reduced and the temperature of the reforming unit 1014 is lowered accordingly. Even if the fuel composition remains unchanged, carbon monoxide concentration at the anode grows along the flow of fuel, as the consumption of hydrogen proceeds. Therefore, carbon monoxide concentration toward the downstream of fuel is higher in a situation of high fuel utilization factor than in a situation of low fuel utilization factor.

(6) When starting the fuel cell system 1100, the fuel cell 1030 can start power generation while the reforming unit 1010 has yet to be started completely (stably) and the carbon monoxide concentration is high. According to the starting method of the present embodiment, it is therefore possible to reduce the time necessary to start the fuel cell system 1100. Incidentally, even if the fuel-cell temperature in an initial phase of startup is below 40° C., the fuel cell need not necessarily be warmed up since the low temperature causes a drop in the output of the fuel cell but no difficulty in startup.

PRACTICAL EXAMPLE 2

Figure 8:
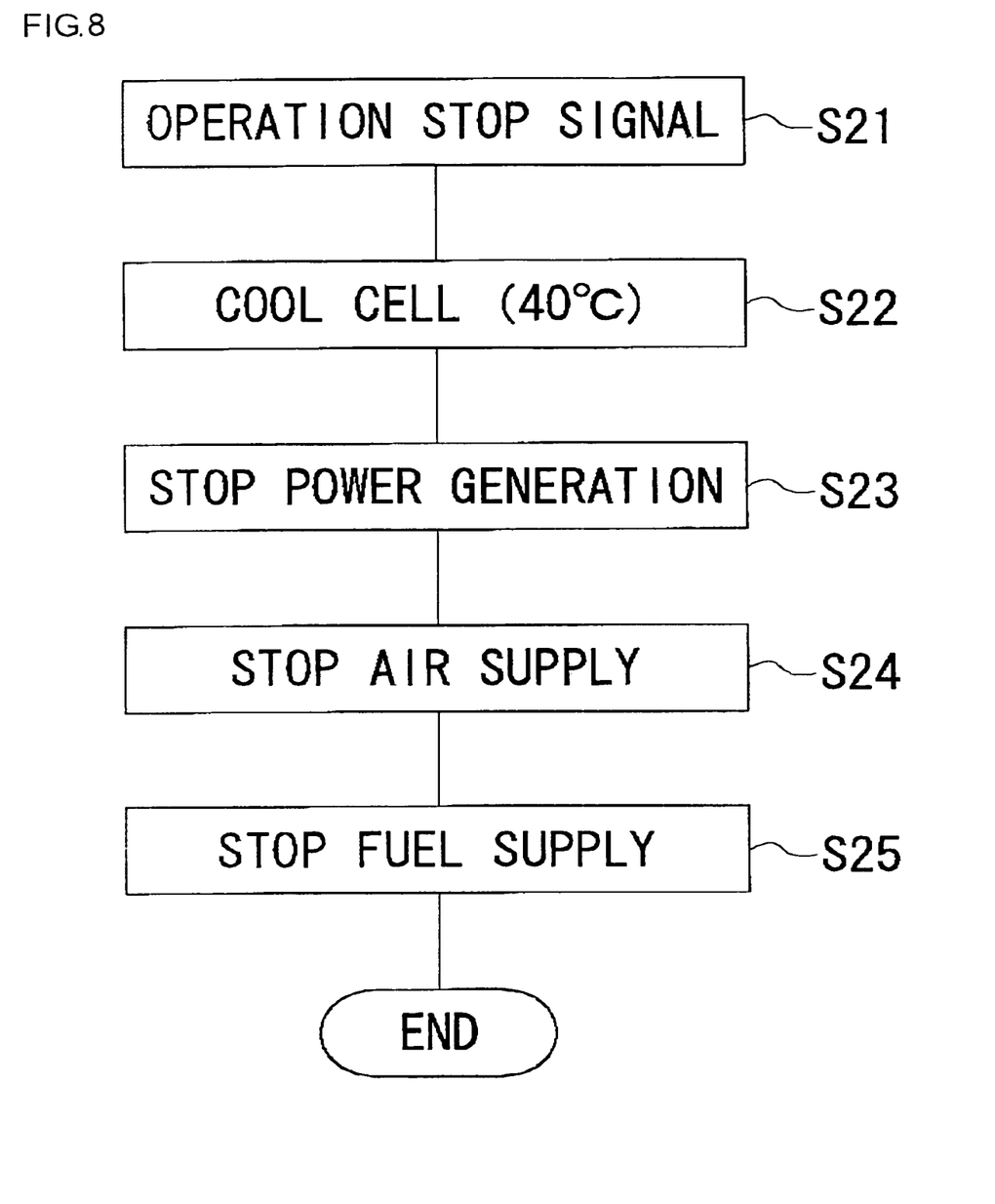
FIG. 8 is a flowchart showing the method of operating a fuel cell system according to practical example 2.

FIG. 8 is a flowchart showing a method of operating (stopping) the fuel cell system 1100. As shown in FIG. 8, when an operation stop signal is input to the fuel cell system 1100 (S21), the fuel cell 1030 is cooled to around 40° C. in temperature (S22). Cooling the fuel cell 1030 lowers the gas diffusion rate in the electrolyte, increases the coverage of the catalysts adsorbing carbon monoxide, and lowers the catalytic activity. If the same amounts of reformed gas and air are supplied, the amount of power generated by the fuel cell 1030 decreases. The fuel cell 1030 is cooled sufficiently before the power generation is stopped (S23). After the power generation of the fuel cell 1030 is stopped, the supplies of the air (S24) and the reformed gas (S25) to the fuel cell 1030 are stopped in succession. Note that the fuel cell 1030 has been supplied with the reformed gas having a high carbon monoxide concentration (for example, 100 ppm and above) since the operation stop signal is input to the fuel cell system 1100. Incidentally, to reduce the amount of residual oxygen in the cathode, the air supply may be stopped before the stop of the power generation, followed by that of the fuel supply.

When the fuel cell system 1100 is stopped according to the foregoing flow, the following effects are expected:

(1) The supply of the reformed gas is stopped at temperatures lower than in normal power generation. This decreases the diffusion rates of hydrogen and oxygen in the electrolyte, thereby suppressing crossover.

(2) Before the fuel cell 1030 stops power generation, the carbon monoxide concentration of the reformed gas is increased to make the catalysts adsorb carbon monoxide. Thus, even if air flows into the anode 1034 in a period since the beginning of the stopping process and elapsed until the system is started next time, oxygen in the air is consumed to oxidize carbon monoxide adsorbed to the catalysts. This can suppress a rise in the potential of the anode 1034, thereby avoiding degradation of the catalysts, or oxidation of ruthenium in particular.

(3) Before the fuel cell 1030 stops power generation, the reformed gas having a carbon monoxide concentration higher than in its ordinary composition is supplied to the anode 1034. Carbon monoxide is thus adsorbed to the catalysts (platinum in particular) of the anode 1034, whereby the generation of protons in the anode 1034 is hindered. Consequently, it is possible to suppress the generation of hydrogen in the cathode 1032 which is ascribable to a leak current, and by extension the direct reaction of hydrogen and oxygen and the reaction of generating hydrogen peroxide when air flows into the cathode 1032.

(4) When the fuel cell 1030 starts power generation, the anode 1034 rises in potential and oxidizes carbon monoxide. This eliminates the need for the operation of removing the adsorbed carbon monoxide. Besides, heat occurs from the increasing excess voltage and the oxidation reaction of carbon monoxide, thereby contributing to warming the cell.

(5) The concentration of carbon monoxide contained in the reformed gas can be increased by at least one of the following measures: reducing the amount of air supplied to the CO remover 1018; decreasing the temperature of the CO remover 1018; increasing the temperature of the transformer 1016; decreasing the temperature of the reformer 1014; and reducing the ratio of the amount of raw fuel to the amount of water vapor (S/C) supplied to the reformer 1014. To prevent the reforming unit 1010 from losing balance, the measures for increasing the carbon monoxide concentration may be switched periodically.

Another method is to reduce the amount of fuel supplied to the fuel cell so as to increase fuel utilization factor.

PRACTICAL EXAMPLE 3

Figure 9:
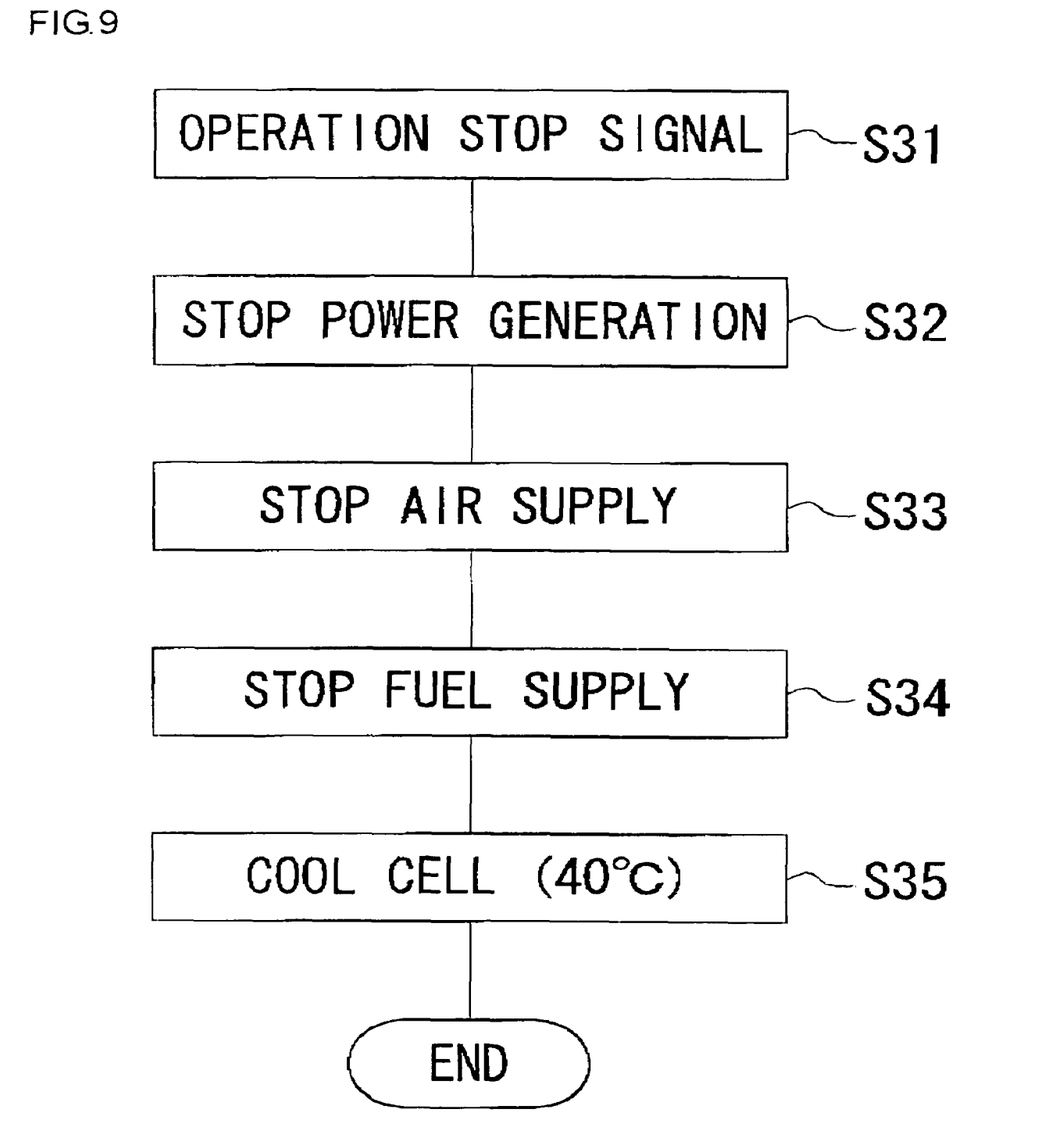
FIG. 9 is a flowchart showing the method of operating a fuel cell system according to practical example 3.

FIG. 9 is a flow chart showing a method of operating (stopping) the fuel cell system 1100. As shown in FIG. 9, when an operation stop signal is input to the fuel cell system 1100 (S31), power generation of the fuel cell 1030 is stopped (S32) and the supply of air (S33) and reformed gas to the fuel cell 1030 is stopped in the stated order (S34). The fuel cell 1030 is then cooled to a temperature of about 40° C. (S35). Cooling of the fuel cell 1030 lowers the gas diffusion rate in the electrolyte, increases the coverage of the catalysts adsorbing carbon monoxide, and lowers the catalytic activity. The reformed gas having a high carbon monoxide concentration (for example, 100 ppm or above) may be supplied to the fuel cell 1030 after the operation stop signal is input to the fuel cell system 1100 so as to continue to generate power for a certain period of time before stopping power generation. Alternatively, to reduce the amount of residual oxygen in the cathode, the air supply may be stopped before the stop of the power generation, followed by that of the fuel supply.

By stopping the fuel cell system 1100 according to the flow described above, the following advantages are expected.

(1) Since the fuel cell is subject to forced cooling, the diffusion rate of hydrogen and oxygen in the electrolyte is lowered as compared to a case where the fuel cell is not subject to forced cooling. This will suppress crossover occurring after power generation is stopped.

(2) Since carbon monoxide concentration in the reformed gas is increased and carbon monoxide is adsorbed in the catalysts before stopping power generation of the fuel cell 1030, oxygen in the air flowing into the anode 104 while the process of stopping the fuel cell system 1100 is proceeding is consumed to oxidize carbon monoxide adsorbed in the catalysts. This can suppress a rise in the potential of the anode 1034, thereby avoiding degradation of the catalysts, or oxidation of ruthenium in particular.

(3) Since the reformed gas richer in carbon monoxide concentration than in its ordinary composition is supplied to the anode 1034 before stopping power generation of the fuel cell 1030, carbon monoxide is adsorbed in the catalysts (platinum in particular) of the anode 1034, whereby the generation of protons in the anode 1034 is hindered. Consequently, it is possible to suppress the generation of hydrogen in the cathode 1032 which is ascribable to a leak current, and by extension the direct reaction of hydrogen and oxygen and the reaction of generating hydrogen peroxide when air is supplied to the cathode 1032.

(4) When the fuel cell 1030 starts power generation, the anode 1034 rises in potential and oxidizes carbon monoxide. This eliminates the need for the operation of removing the adsorbed carbon monoxide. Besides, heat occurs from the increasing excess voltage and the oxidation reaction of carbon monoxide, thereby contributing to an increase in the rate of warming of the cell.

(5) The concentration of carbon monoxide contained in the reformed gas can be increased by at least one of the following measures: reducing the amount of air supplied to the CO remover 1018; decreasing the temperature of the CO remover 1018; increasing the temperature of the transformer 1016; decreasing the temperature of the reformer 1014; and reducing the ratio of the amount of raw fuel to the amount of water vapor (S/C) supplied to the reformer 1014. To prevent the reforming unit 1010 from losing balance, the measures for increasing the carbon monoxide concentration may be switched periodically. Another method is to reduced the amount of fuel supplied to the fuel cell so as to increase fuel utilization factor.

According to the present embodiment, it is possible to avoid degradation of the fuel cell.

The present embodiment is applicable to a type of fuel cell in which reformed gas is supplied to its anode.

What is claimed is:

1. A fuel cell system comprising:
   a fuel cell stack including a laminate formed by combining a membrane electrode assembly composed of an electrolyte membrane, an anode jointed to one side of the electrolyte membrane, and a cathode joined to the other side of the electrolyte membrane, with a fuel channel plate having a fuel channel for supplying a fuel to the anode, an oxidant channel plate having an oxidant channel for supplying an oxidant to the cathode, and a heat-medium channel plate having a heat-medium channel for a heat medium to flow through;
   a unit which cools the heat medium exhausted from the fuel cell stack before puffing the heat medium into the fuel cell stack for circulation;
   a fuel humidifying unit which humidifies the fuel by heat exchange with the heat medium;
   an oxidant humidifying unit which humidifies the oxidant by heat exchange with the heat medium; and a control unit which stops power generation of the fuel cell in a system stopping process while continuing the circulation of the heat medium until a predetermined cooling stop condition holds.

2. The fuel cell system according to claim 1, wherein the control unit adjusts an amount of circulation of the heat medium so that a difference between a temperature of the heat medium exhausted from the fuel cell stack and a temperature of the heat medium put into the fuel cell stack falls within a predetermined range during a period in the system stopping process until the predetermined cooling stop condition holds.

3. The fuel cell system according to claim 1, wherein the control unit determines the cooling stop condition to be that a temperature of the heat medium exhausted from the fuel cell stack falls below a value determined as a function of outside air temperature.

4. The fuel cell system according to claim 1, wherein the control unit determines the cooling stop condition to be that a predetermined time elapses since the system stopping process is started.

5. A method for operating a fuel cell system comprising a reforming unit which reforms a raw fuel into a hydrogen-containing fuel, and a fuel cell which generates electric power from the fuel, the method comprising supplying the fuel including carbon monoxide of a concentration higher than the concentration in a normal operation to the fuel cell when starting the fuel cell system.

6. The method for operating a fuel cell system according to claim 5, comprising starting power generation of the fuel cell at a temperature lower than a normal power generation temperature of the fuel cell.

7. A method for operating a fuel cell system having a reforming unit which reforms a raw fuel into a hydrogen-containing fuel and a fuel cell which generates electric power from the fuel, the method comprising: when stopping the fuel cell system, supplying the fuel including carbon monoxide of a concentration higher than the concentration in a normal operation to the fuel cell;

cooling the fuel cell to a temperature lower than a normal power generation temperature of the fuel cell; and stopping power generation of the fuel cell, following the cooling of the cell.

* * * * *